(12) United States Patent
Miao

(10) Patent No.: US 6,480,491 B1
(45) Date of Patent: Nov. 12, 2002

(54) LATENCY MANAGEMENT FOR A NETWORK

(75) Inventor: Kai Miao, Boonton Township, NJ (US)

(73) Assignee: Intel Corporation, Santa Clara, CA (US)

( * ) Notice: Subject to any disclaimer, the term of this patent is extended or adjusted under 35 U.S.C. 154(b) by 84 days.

(21) Appl. No.: 09/704,941

(22) Filed: Nov. 2, 2000

(51) Int. Cl.⁷ .............................................. H04L 12/56
(52) U.S. Cl. ....................... 370/394; 370/412
(58) Field of Search ............................ 370/394, 235, 370/235.1, 410, 412, 415, 417, 522, 519, 376, 516

(56) References Cited

U.S. PATENT DOCUMENTS

| | | | | |
|---|---|---|---|---|
| 5,319,360 A | * | 6/1994 | Schrodi et al. ............ | 370/394 |
| 5,563,877 A | * | 10/1996 | Van Tetering et al. ...... | 370/394 |
| 5,623,483 A | * | 4/1997 | Agrawal et al. ............ | 370/519 |
| 5,862,136 A | * | 1/1999 | Irwin ......................... | 370/376 |
| 5,940,479 A | * | 8/1999 | Guy et al. .................. | 370/410 |
| 6,212,206 B1 | * | 4/2001 | Ketcham ..................... | 370/516 |

OTHER PUBLICATIONS

Heo et al., "Apparatus and method for restoring cell sequence in multipath ATM switches", US 2002/0051453 A1, May 2, 2002.*

* cited by examiner

Primary Examiner—Wellington Chin
Assistant Examiner—Maikhanh Tran
(74) Attorney, Agent, or Firm—Kaplan & Gilman, LLP

(57) ABSTRACT

A buffer receives packets of data, and places them in appropriate locations such that they are read out after varying delays. Late arriving packets are assigned a negative delay, and if too many packets are late arriving, the system begins reading out the late arriving packets from a different location in storage, rather than allowing such late arriving packets to be lost.

21 Claims, 5 Drawing Sheets

LATENCY MANAGEMENT FOR A NETWORK

TECHNICAL FIELD

This invention relates to data transmission, and has particular application in the transmission of audio or facsimile data that previously was conventionally sent over a telephone network but which is now often sent over a packet switched network such as the Internet.

BACKGROUND OF THE INVENTION

Recently, it has become commonplace to transmit voice, facsimile and other information conventionally transmitted over the telephone network over a data network. The transmission of such information over data networks, such as the Internet, costs less and results in more efficient use of network bandwidth. Indeed, many engineers involved in Internet technology believe that within the next few years, virtually all telephone traffic will be conveyed over the Internet.

One problem which occurs due to the transmission of audio traffic over the Internet relates to the breaking up of such traffic into packets. Specifically, for the completion of a telephone call between two users over a conventional public switched telephone network (PSTN) connection, a circuit is constructed between those users. The full bandwidth of that circuit is available for use by the telephone call, and that bandwidth is usually more than what is required for the call.

When the call is conveyed over the Internet, the audio signal from either party is broken down into packets which are conveyed individually, sometimes using different paths, through the data network. When the packets exit the data network, they are used to reconstruct the analog audio signal for conveyance to the listening party.

FIG. 3 shows an exemplary architecture for the previously described Internet telephone call. More specifically, after call set-up, an audio signal originating at telephone 301 would travel over a circuit switched connection through PSTN 302 to a gateway 303. The gateway 303 packetizes the audio signal and conveys the packets as previously described over data network 304. The packets are received at gateway 305, often out of order due to the varying network delays experienced by the different packets, and are reassembled by gateway 305. The packets are then converted to analog audio, and the analog audio signal is conveyed through PSTN 306 to the telephone 307. As indicated by data connection 320 and computer 322, portions of the signals may or may not travel over the PSTN.

One problem with the architecture of FIG. 3 is the varying delays to which the packets are subjected as they travel through the Internet 304. If packets arrive out of order, they must be reassembled prior to converting the signal back to analog and conveying it to the other party. To facilitate such reordering of the packets at an exemplary receiving gateway 305, a buffer usually stores several arriving packets so that packets arriving later and out of order can be placed into the proper sequence prior to the conversion of the digital data to analog form by gateway 305.

In order to minimize "latency," the delay that the audio signal experiences between the time it leaves telephone 301 and the time it arrives at telephone 307, it is desired to minimize the length of the foregoing described buffer. A long buffer means a long time that packets wait in the buffer before being conveyed. Thus, a long buffer means that there will be large latency, which is undesirable.

However, if the buffer is made too small, later arriving packets will be lost. For example, suppose the buffer length is set such that it holds each arriving packet for 250 milliseconds prior to sending it out to the receiver. Suppose two consecutive packets are transmitted, the first traversing the network in 500 milliseconds, and the second traversing the network in only 10 milliseconds. The second packet will arrive, be held at the receiving buffer for 250 milliseconds, and then sent to the receiver. The first packet will then arrive nearly a quarter of a second later. By the time the first packet arrives, the second packet has already been read out. Since the packets may represent audio, s it would then make no sense to read out the first packet after a later packet has already been read out.

Prior art systems exist which optimize the buffer length by performing calculations based upon a trade off between latency and probability of packet loss. Moreover, U.S. patent application Ser. No. 09/585,744 describes and claims a technique which dynamically adjusts the buffer size in response to the varying delays of packets through the network, in order to constantly maintain the optimal buffer size on a dynamic basis.

The problem with all prior techniques is that they fail to account for a group of packets that might be subject to a temporary and a typically excessive delay. This could happen, for example, if all of a sudden one of the network routers was taken out of service. Until the routing protocols responded by routing data around that router, there would be a sudden increase in delay through the network. This temporary a typical delay, called a "group delay" herein, results in several packets experiencing increased latency.

In view of the above, there exists a need in the art for a technique of trading off latency and probability of packet loss to achieve the proper buffer length in a receiving gateway, which technique also should account for temporary group delay through the Internet.

DETAILED DESCRIPTION OF THE PREFERRED EMBODIMENT

Figure 1:
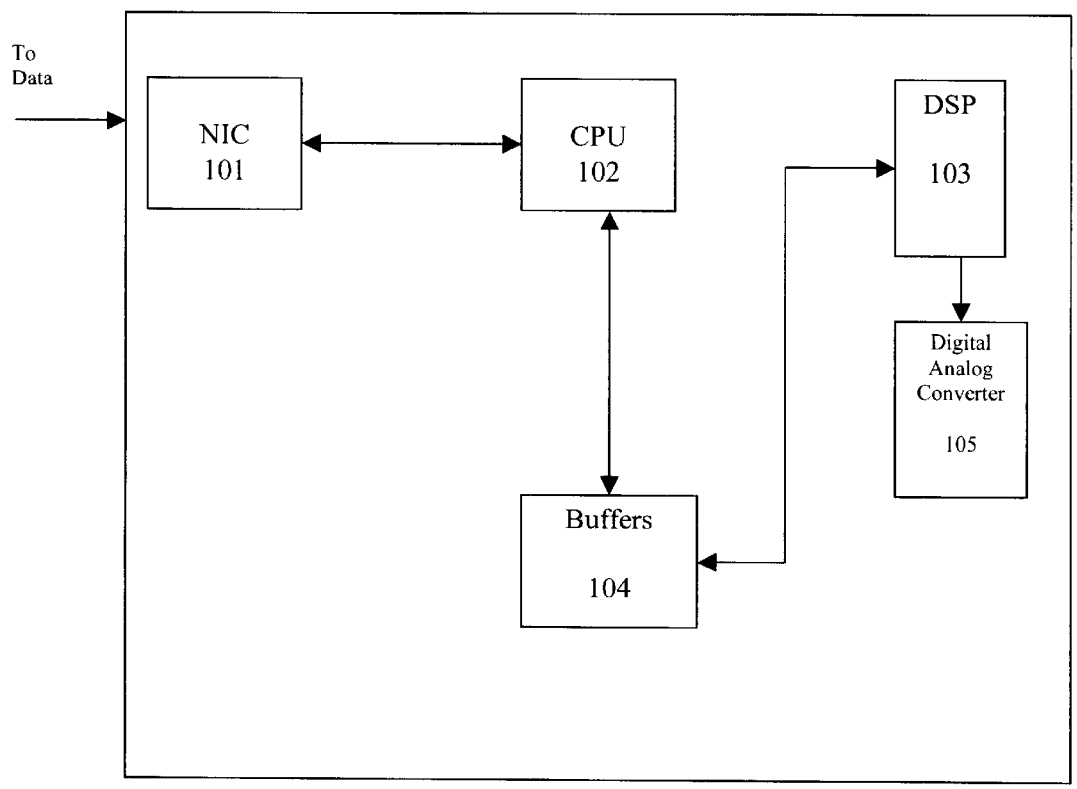
FIG. 1 depicts the functional architecture of an exemplary receiving gateway which may be used to implement the teachings of the present invention.
Figure 3:
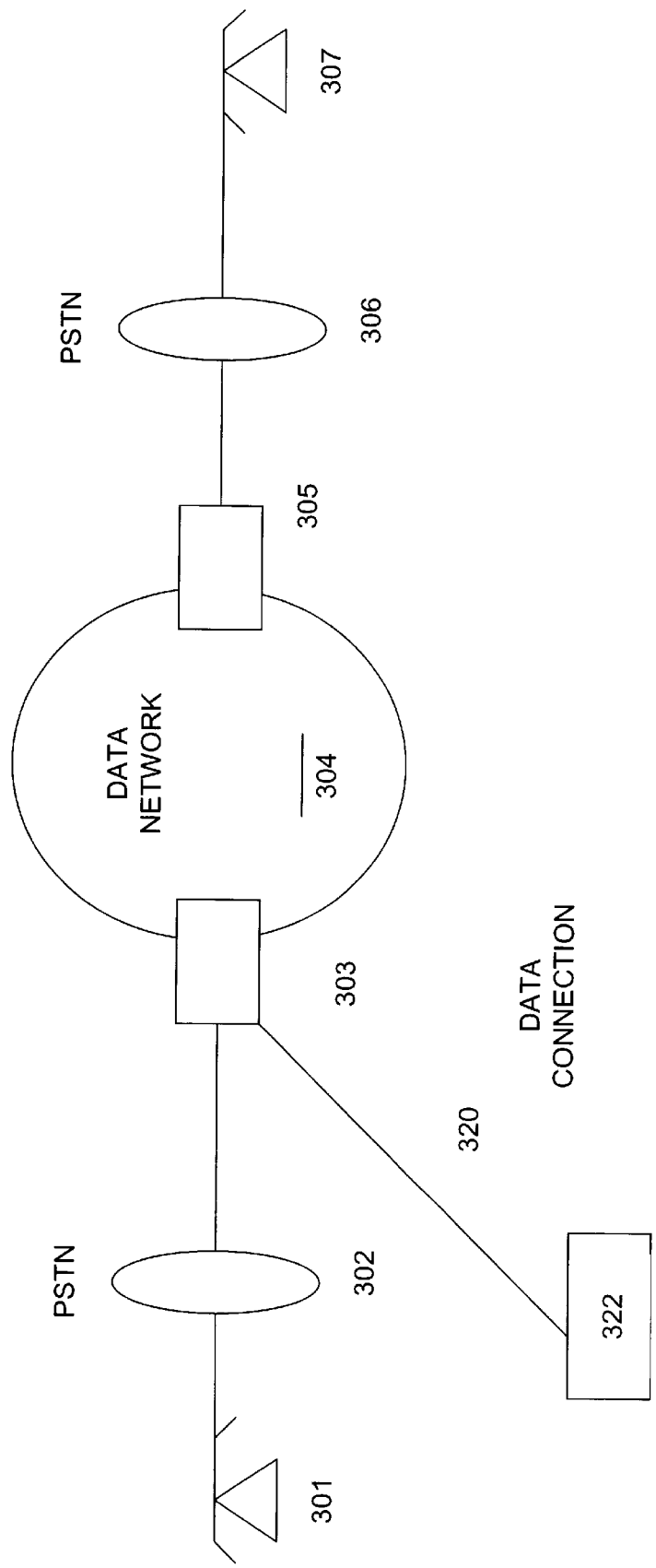
FIG. 3 shows an exemplary prior art architecture for transmitting voice over the Internet.

FIG. 1 is a block diagram of an exemplary embodiment of the invention. The architecture of FIG. 1 can be used in the system of FIG. 3 to replace gateway 303 of FIG. 3. In accordance with the present invention, data representing the telephone call arrives in packets from the data network at network interface card (NIC) 101. A NIC is a conventional product which implements the appropriate network protocols, such as TCP/IP or similar protocols. The NIC may be responsible for receiving digital packets and delivering the packets through the CPU 102 to the remainder of the systems.

The decoded data is then sent through CPU 102 to a buffer 104. CPU 102 may work in conjunction with an optional digital signal processor (DSP) 103. The CPU 102 serves to place arriving packets in the buffer 104 in the appropriate order so as to be read out in sequence by digital to analog converter (D/A) 105. The optional DSP 103 may be utilized to perform some or all of the computationally expensive signal processing required to process the data beyond the processing done by the (NIC) 101.

As discussed in application Ser. No. 09/585,744, the CPU 102 calculates an appropriate additional delay to be introduced to each packet as that packet arrives for storage in buffers 104. More specifically, the CPU 102 introduces an amount of delay to each arriving packet, such that the introduced delay, plus the delay through the data network 304, will equal a fixed value. As described in the '744 application, a histogram of packet delays is maintained, based upon the delay experienced by each packet traversing the network. The receiving system then dynamically updates the histogram for packet delays, and calculates an acceptable probability of packet loss. That is, the system dynamically calculates that all packets experiencing a network delay in excess of X shall be discarded, where X is updated based upon the histogram of packet delays. Arriving packets are then delayed upon arrival by an amount equal to X, the optimum latency, minus the delay that the packets experienced in traversing the network. Thus, each packet experiences the optimum latency, and if a packet experiences more than the optimum latency in traversing the network, it is discarded.

Figure 2:
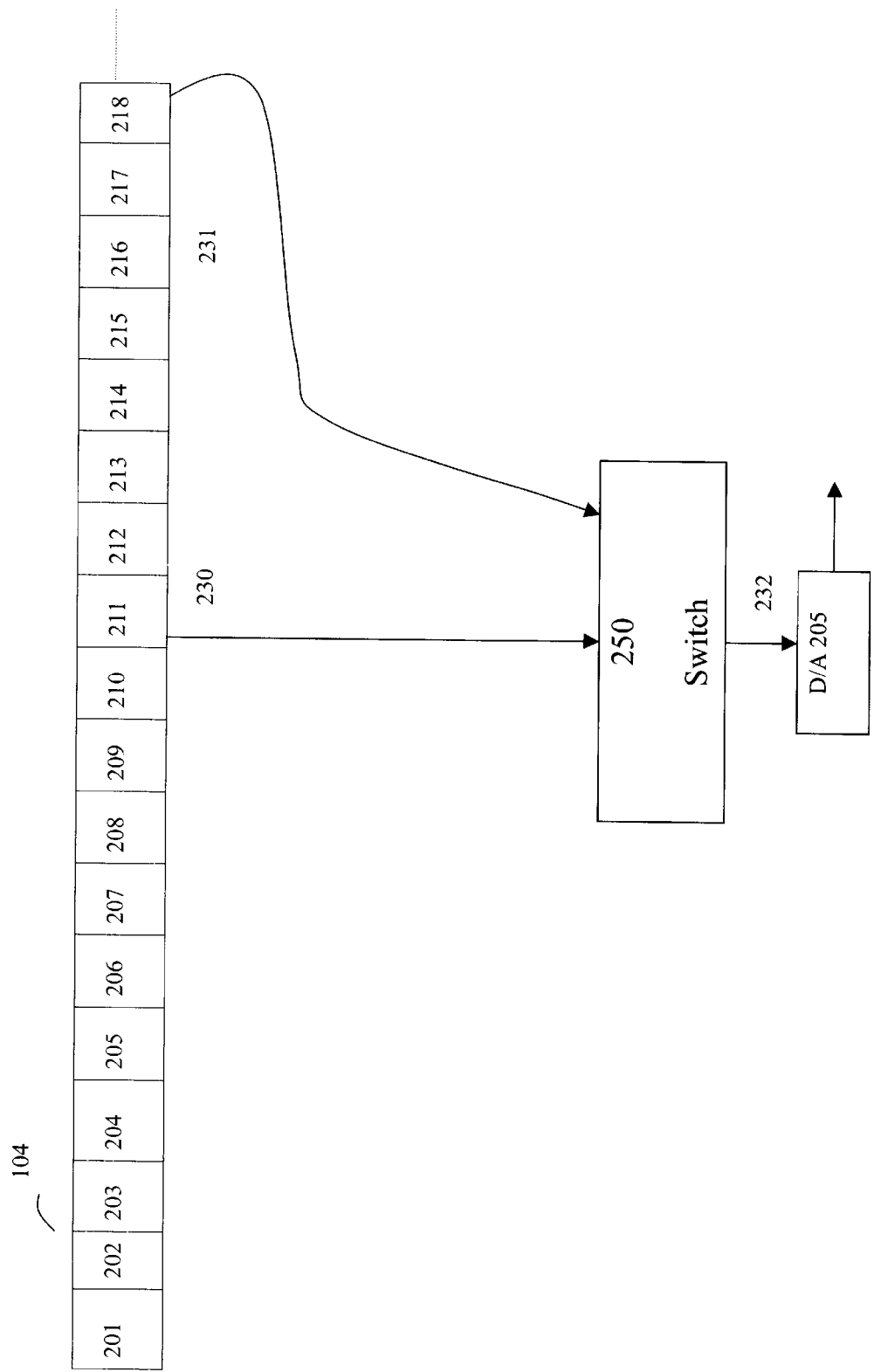
FIG. 2 shows a diagram of a queue of receiving buffers to be read out according to an exemplary embodiment.

FIG. 2 shows a conceptual diagram of buffers 104 connected to the digital to analog converter 105 of FIG. 1. The connection 106 is also represented in more detail as connections 230–232 and switch 250. Exemplary locations 201–218 represent buffers into which packets arriving at a receiving gateway 305 are placed.

In operation, one exemplary manner in which the delay required for each packet may be introduced relates to the position in buffers 104 in which the arriving packet is placed. More specifically, in normal operation, the arriving packets are each placed into a separate one of buffers 201–210. The buffers are then shifted from left to right and the packets conveyed out to digital to analog converter 105.

As packets arrive, they are placed into one of locations 201–210 to be read out as the packets are shifted rightward in FIG. 2. Thus, a packet which experiences a relatively short delay through the network will be placed relatively far to the left (e.g., location 202 or 203), whereas a packet that experiences a relatively long delay through the network will be placed closer to the right (e.g., 208 or 209). Thus, the shorter the delay through the network, the more to the left the packet will be placed. Because of the left to right shifting, this means that packets experiencing a short network delay will experience a longer delay in the receiving gateway's buffer because it will take longer to be shifted. This results in the total delay of all of the packets being substantially equal. By examining the time stamp placed within the packet by the gateway transmitting the packet onto the Internet, and by comparing that time stamp to the local clock at the receiving gateway, the delay through the network can be calculated. Note that due to the fact that the clocks at the transmitting and receiving gateways X may not be exactly synchronized, the network delay calculated is not an actual network delay, but a network delay relative to the network delay of other packets transmitted through the network.

For example, if a packet experienced a relatively short delay through the network, it would be placed in location 202. Another packet, which experiences a relatively lengthy delay through the network, would be placed into location 210, which introduces a significantly shorter delay. Since the system designer knows in advance the amount of delay introduced by each rightward shift of buffer 104, the appropriate location for each packet can be calculated in order to ensure that the correct delay is introduced that effectively equalizes the total delay (i.e. network plus additional) among the arriving packets.

From time to time, one or more packets may experience such an extensive delay, that it is lost at the receiver. More specifically, consider a packet A that arrives at the receiving gateway 305 and is placed into location 208 of FIG. 2. As the packets are shifted rightward, packet A, originally placed into location 208, will be read out of location 211 four-time slots later, where a time slot is the amount of time for one rightward shift. A second packet B, transmitted from transmitting gateway 303 just prior to packet A, should arrive and be placed in location 209. This ordering would mean that the packet B would be read out of location 211 just prior to packet A, as location 209 is read out over line 230 just prior to location 208 in FIG. 2.

Consider however, the situation wherein packet B is delayed much longer than expected. It is possible that packet A may be read out of location 208 and converted to analog data prior to packet B even arriving. At that point, packet B would simply be lost because once a packet is converted into analog audio, a packet which represents a prior portion of the audio signal can not be transmitted later.

Depending upon the length of buffer 104, a certain number of packets will be lost. In the exemplary buffer 104 shown in FIG. 2, a packet experiencing the shortest delay will be placed into location 201. Such packet will take ten rightward shifts before being read out of location 211. If the packet that is supposed to arrive just prior to that packet is delayed, the delayed packet may arrive after the packet from location 201 has already been shifted out of the buffer 104.

Normally, packets which arrive too late, such as that described in the previous paragraph, are simply lost. The buffer is made long enough to account for an acceptable probability of loss. If however, a burst of packets are delayed, then the system will potentially lose several consecutive packets, resulting in lower quality voice transmission. Due to the fact that it is desirable, for latency minimization purposes, to minimize the length of the buffer 104, a long buffer that would handle potential packet bursts is undesirable.

In accordance with the invention however, the length of buffer 104 is temporarily increased to account for burst delay. One manner in which this may be accomplished is to temporarily change the read out location in FIG. 2 from buffer 211 to buffer 218 upon the detection of burst delay. At the end of the burst, the read out location, and thus the length of the buffer, is returned to location 211 as before the burst.

Figure 4:
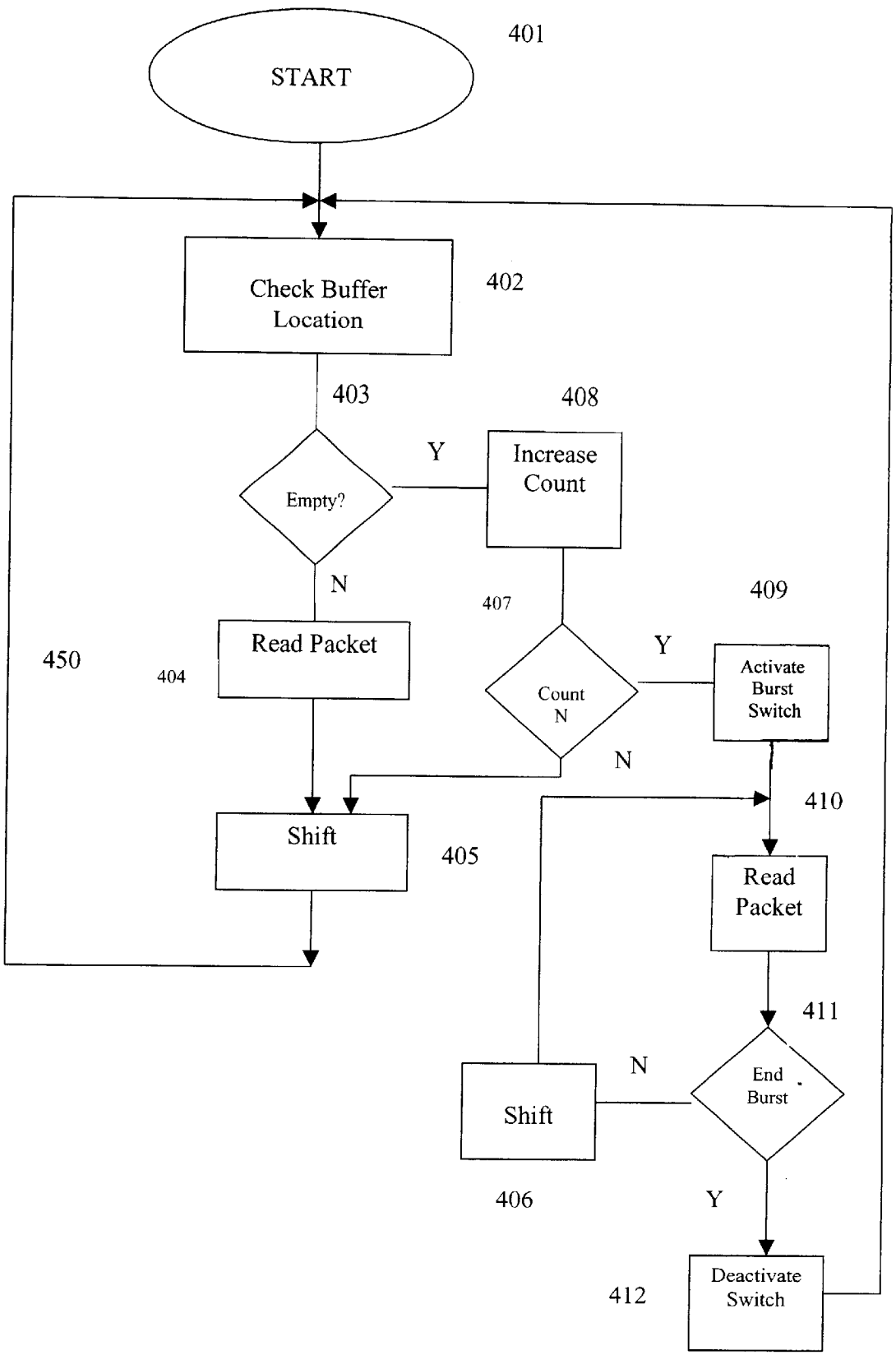
FIG. 4 is a flow chart of an exemplary algorithm for implementing the present invention at a sample receiving gateway such as 305.

FIG. 4 shows an exemplary flow chart of the steps of the present invention. The arrangement of FIG. 4 can be implemented by CPU 102 in order to facilitate the reading out of information from buffers 104. At start 401, the location of the initial line 230, location 211, is checked for information. If a packet exists in location 211, then decision point 403 will transfer control to block 404 for reading out the packet. The register is then shifted left to right at block 405, thereby placing the packet previously in location 210 into read-out location 211. As indicated by loop 450, the process continues checking for packets and reading them out as previously described.

If, upon checking location 211, it is found to be empty, then decision point 403 will increase a counter at block 408. The counter begins at zero. After the count is increased to block 408, decision point 407 determines if the count has reached the predetermined count.

The predetermined count N is defined in advance as the number of consecutive storage locations in buffer 104 that arrive empty at readout location 211. Typically, N would be in the range of 2 or 3, but could be different as well. More specifically, if every packet arrived within the time limits that the length of the buffer 204 can process, then after each rightward shift, a packet should be ready for readout in at location 211. If, after reading out a packet, a rightward shift results in location 211 then being empty, that means that the next packet that is supposed to be read out has been delayed by too much, and is lost.

In most cases, the system will simply read the next packet after the next shift, and the infrequent lost packets are acceptable. However, if the system reads a number N of consecutive empty locations, this means that a burst of packets have experienced an abnormally long delay through the network, and may be lost. In such a situation, the system will attempt to recover from the lost burst of packets by temporarily reading packets out from the rightmost location in buffer 104 that contains a packet.

As packets arrive, if any of the packets are "too late", that is, packets previous to the arriving packets have already been conveyed out of location 211, then those late arriving packets are assigned a negative delay. Thus, all packets placed to the right of location 211 are packets that require a negative delay in order to make their network delay plus the additional delay added at the receiving gateway add up to the total fixed delay set for each packet as previously discussed. For example, if the total delay is supposed to be 2 seconds, and the packet experiences a network delay of 2.3 seconds, it will require a delay of negative 0.3.

As shown in FIG. 2, a second location out of which packets may be read is location 218. Presuming that each shift requires 0.15 seconds, the exemplary packet discussed above would be placed in location 216. By so placing the packet, the packet will be two location shifts, and thus, 0.3 seconds, from location 218. Each packet arriving too late to be read out will be placed in a location relative to location 218 and such that all of the packets arriving too late to be read out of location 211 will be read out in sequence from location 218 if the system began reading packets from 218.

If the count has not reached N at decision point 407, then the register is shifted again and the process repeats itself, continuing to count empty storage locations at the decision points 403 and 407 until that count equals the predetermined number N.

When N predetermined consecutive empty storage locations are read, the switch 250 is activated at block 409. The switch 250 causes the read-out point to be location 218, rather than location 211. At block 410, a packet is read from location 218. If the burst is ended, at decision point 41 1, then the switch is deactivated in order to return the read-out point to location 211. If however, there are more packets within the burst, then the packets continue to shift left to right at block 406 and continue to be read-out of location 218 as indicated in flow chart of FIG. 4.

Note that as the packets are read-out from location 218, all of the locations left of location 211 (e.g., 201–210), continue to be shifted as well. This has the effect of insuring that once the system completes reading out the first packets which are stored to the right of the location 211, and then the switch is deactivated, all of the subsequent packets will not represent empty locations.

It is noted that the two competing criteria, latency and packet loss probability, each take different priorities at different times in operation of the system. Specifically, during normal operation, latency is minimized by using a relatively short buffer length, and accepting a given amount of packet loss. When a burst of delayed packets occurs, such as in a sudden network congestion situation, the buffer is temporarily lengthened, preferably by changing the readout location, so that all of the packets subject to the sudden burst of delay are not lost. However, because the extended delay is only temporary, and ends when the remaining packets subject to the burst are conveyed, latency is not a problem.

It is noted that while the above describes the hardware implementation based on buffer length, the invention is not so limited. More specifically, the invention may be implemented entirely in software. Normally, packets experiencing a delay of above a predetermined value would simply be discarded, however, the system may ascertain by checking the time stamp on each packet whether or not a predetermined number N of consecutive packets experiences a delay beyond the predetermined value. If the group of packets experiencing such delay exceeds the predetermined value N, then the delayed packets are not discarded, but are instead processed and converted to analog signal for conveyance to the user. Thus, a more general sense, the invention comprises processing or conveyance to the end user all packets that experience a delay less than a predetermined value, and not processing or conveying packets that experience a delay beyond said value, unless a specified number of consecutive packets experiences excessive delay.

Figure 5:
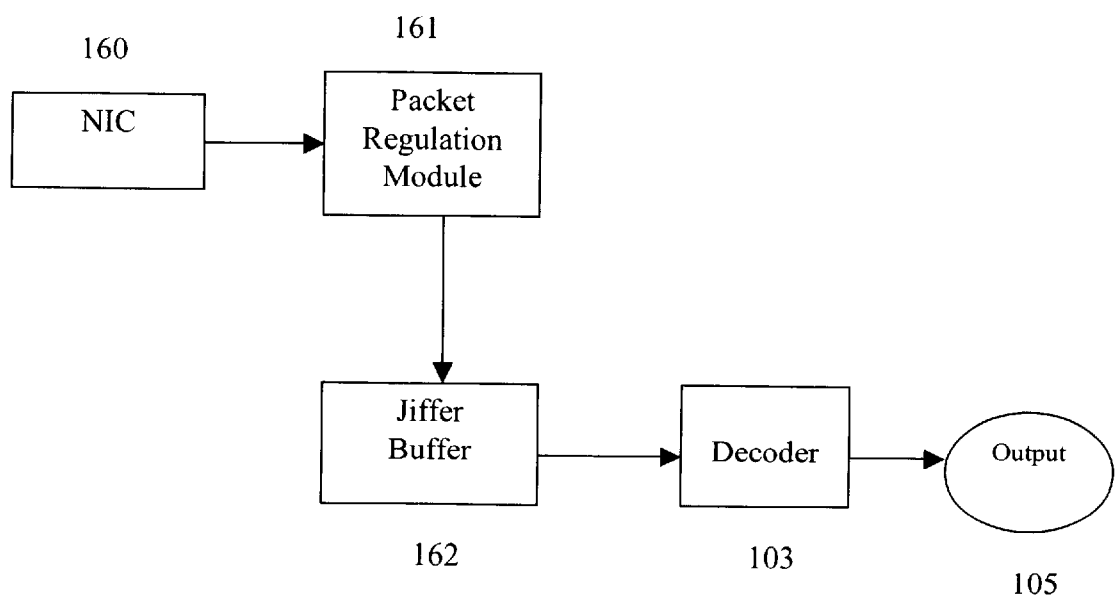
FIG. 5 is an alternative embodiment of the present invention.

FIG. 5 represents an alternative embodiment of the invention. Although the basic functionality of the arrangement of FIG. 5 is similar to that of FIG. 1, the tasks performed by each block are slightly different.

The NIC 160 performs the required network protocol interface functions. Examples of such protocols know in the art are UDP/IP and Asynchronous Transfer Mode (ATM).

Block 102, the Packet Regulation Module (PRM), performs the basic packet processing and parsing of information. PRM 160 extracts time stamps and data, as well as any other relevant information, from the packets. The PRM also is responsible for assigning the local receiving time stamp to each packet, recording time on the local receiving clock that the packet is received. The PRM implements the processing required to maintain the histogram discussed previously, to calculate the optimal latency, and to store, sequence, and readout the packets. The PRM also determines if at least N packets have been delayed, in order to account for the burst delay discussed above. The PRM effectively monitors packet receipt, controls readout from the system, and implements all of the processing for the methods discussed previously herein. The PRM may be implemented in software on a digital signal processor, a general purpose processor, or a combination of both.

The Jitter Buffer module 162 stores the packets in a manner that each packet is delayed the appropriate amount as specified by the PRM and as discussed above. Effectively, the jitter buffer is the delay introduced as discussed above. The jitter buffer may be a sequence of timers that sets the appropriate time to read out each packet.

The remaining two boxes decode the data (103) and output it to an appropriate destination. The destination may be a storage device, a realtime playout device, or any appropriate destination.

While the above defines the preferred embodiment of the invention, various other modifications and additions will be apparent to those of skill in the art. It is intended that the invention be construed to cover all such variations and modifications that fall within the spirit and scope of the appended claims.

What is claimed:

1. An apparatus comprising:
   a buffer to store packets received from a data network, and to facilitate sequential readout of said packets, and
   a processor to change a location within said buffer at which the packets are sequentially read out if said network causes predetermined delay characteristics to said packets.

2. Apparatus of claim 1 wherein said predetermined delay characteristics comprise a specified number of sequential packets arriving from the data network at a time such that packets to be read out of the buffer after said specified number of sequential packets have already been read out of the buffer.

3. Apparatus of claim 2 further comprising changing said location from which said packets are sequentially read a second time after said specified number of sequential packets are read out of said buffer.

4. Apparatus of claim 3 further comprising a digital to analog converter connected to said buffer for receiving the packets after said packets are read out of said buffer.

5. Apparatus comprising a buffer having plural storage locations, the buffer to shift data sequentially from each storage location to an adjacent storage location, a switch having inputs connected to at least two of the storage locations, and a processor to control which switch input is active in response to various delays experienced by data in traversing a network prior to being stored in said buffer.

6. Apparatus of claim 5 wherein the processor controls which switch input is active in response to a determination that a predetermined number of consecutive packets of data have been subjected to a delay greater than a predetermined amount.

7. Apparatus of claim 6 wherein the processor again switches the active input of the switch after the packets subjected to a delay greater than a predetermined amount have been read out of the buffer.

8. Apparatus of claim 7 further comprising a Network Interface Card (NIC) for receiving the data from a data network, and a Digital Signal Processor (DSP) for processing the received data.

9. Apparatus comprising:
   a buffer having a length and configurable for storing packets received from a data network, and for allowing sequential readout of said packets, and
   a processor for changing the length if the data network causes the packets to experience predetermined delay characteristics;
   wherein the length is changed by switching the location of the buffer from which packets are read out.

10. A method comprising:
    placing each of a plurality of plural arriving packets into a separate location of a buffer,
    reading said packets sequentially out of a first location in said buffer, and
    upon detecting a predetermined number of sequential packets that have experienced a delay of at least a predetermined value, initiating the sequential readout of said packets from a second location of said buffer.

11. The method of claim 10 wherein detecting the predetermined number of sequential packets comprises detecting a predetermined number of sequential empty storage locations.

12. The method of claim 11 further comprising switching the active input of a switch to facilitate the said sequential readout of said packets from said second location of said buffer.

13. A method comprising receiving packets from a data network and assigning positive delays to all packets received after experiencing a network delay of less than a predetermined value, and assigning negative delays to all packets received after experiencing a delay of more than said predetermined value, and placing all packets with a negative assigned delay on a first side of a readout location in a buffer and all packets with a positive assigned delay on a second side of a readout location in a buffer.

14. The method of claim 13 wherein the packets with negative assigned delay are placed in a location relative to each other that is based at least in part on the value of said delay.

15. The method of claim 13 wherein the packets with positive assigned delay are placed in a location relative to each other that is based at least in part on the value of said delay.

16. A method comprising receiving packets from a data network and placing the packets into a buffer having a length and temporarily changing the length of the buffer when a predetermined number of packets experience excessive delay.

17. The method of claim 16 wherein the length change is facilitated by changing the readout location of the packets.

18. The method of claim 17 wherein the excessive delay is detected by counting empty storage locations within the buffer.

19. A method comprising:
    receiving incoming packets;
    processing all received packets delayed less than a predetermined amount, and discarding packets delayed more than said predetermined amount, unless at least a predetermined number of such packets are so delayed, in which case, said at least a predetermined number of said packets is not discarded.

20. The method of claim 19 wherein said step of processing includes placing the packets into a buffer.

21. The method of claim 20 wherein said step of processing comprises placing excessively delayed packets in a first portion of memory and placing other packets in another portion of memory.

* * * * *